United States Patent Office 3,000,702
Patented Sept. 19, 1961

3,000,702
MANUFACTURE OF SODIUM FLUORIDE
George L. Cunningham, Burtonsville, Md., assignor to W. R. Grace & Co., New York, N.Y., a corporation of Connecticut
No Drawing. Filed May 23, 1958, Ser. No. 737,196
4 Claims. (Cl. 23—88)

This invention relates to a process for the manufacture of sodium fluoride relatively low in silica content. More particularly, this invention relates to a cyclic process whereby sodium fluoride, relatively low in silica content and ammonium chloride, may be manufactured from cheap and readily available raw materials.

As manufactured at the present time, technical sodium fluoride contains 94% to 97% NaF and 1.5% to 5.0% sodium silicofluoride ($Na_2SiF_6$). The latter impurity makes the sodium fluoride unsuitable for use in the manufacture of cryolite.

In accordance with the process described herein, the preparation of sodium fluoride is effected from relatively inexpensive raw materials, without the use of acid-grade fluorspar, without the use of sulfuric acid, without excessive evaporation, and with a minimum amount of liquid in the several steps of the process, whereby an economy of operation hitherto unobtainable is achieved.

Sodium fluoride has been prepared in a wide variety of ways. For example, it has been produced by reacting an alkaline earth fluoride such as fluorspar ($CaF_2$), with sulfuric acid to produce calcium sulfate and hydrofluoric acid. The relatively insoluble calcium sulfate is filtered off or otherwise removed and the hydrofluoric acid is reacted with sodium carbonate or sodium hydroxide to produce sodium fluoride. The sulfuric acid used in the process is fairly expensive and corrosive. The hydrofluoric acid produced is very corrosive and quite poisonous. The sodium carbonate and sodium hydroxide are relatively expensive and thus add to the cost of the sodium fluoride.

Attempts have been made to simply substitute sodium chloride for the sodium carbonate or sodium hydroxide of the above mentioned usual process of making sodium fluoride. However, the yield of sodium fluoride is not good, probably due to the effect of the hydrochloric acid upon the reaction equilibrium. It has been attempted to remove the HCl by heating but, in this case, a mixture of HCl and HF are removed.

Numerous processes have been developed based on the fusion of fluorspar ($CaF_2$) with sodium carbonate and an oxide such as $SiO_2$, $Al_2O_3$, $Fe_2O_3$, etc., to produce a mixture of sodium fluoride and a calcium salt of the oxide in question. The sodium fluoride is then extracted with water and the solution is evaporated to recover sodium fluoride. In these processes the yield of sodium fluoride is relatively high. However, such processes suffer from one particularly noticeable disadvantage when employed for the production of sodium fluoride, namely, the limited solubility of sodium fluoride in water. As a consequence the processes require very large volumes of water and thus excessive evaporation. In addition to this, a double or complex salt composed of sodium fluoride and the calcium salt forms when the molten mass cools, and this compound is quite slow to dissolve.

A process has been developed whereby potassium carbonate is substituted for sodium carbonate in the fusion step. The fused mixture contains potassium fluoride which is dissolved in water (U.S. 2,737,442). The resulting potassium fluoride is reacted with sodium carbonate to precipitate sodium fluoride and regenerate potassium carbonate which is used in the next cycle. This process avoids the use of excessive volumes of water since potassium fluoride is very soluble. In this case, a double or complex salt is formed in the melt between potassium fluoride and the calcium salt and that is slowly extracted with water in spite of the great solubility of potassium fluoride in water. The corrosion of the molten melt is also a considerable problem although suitable ceramic materials have been discovered for constructing the fusion vessel.

Processes have been devised for the production of sodium fluoride based on the thermal decomposition of sodium silicofluoride to sodium fluoride and silicon tetrafluoride (U.S. 1,896,697, U.S. 2,588,786, 1,730,915, 2,602,726, and U.S. 1,664,348). These processes are faulty in that relatively high temperatures are required to decompose the sodium silicofluoride and thus it is very difficult to carry the reaction to completion.

Numerous processes have been developed for reacting sodium silicofluoride or potassium silicofluoride with sodium carbonate or sodium hydroxide for the production of sodium fluoride and hydrated silica or sodium silicate (U.S. 1,382,165, U.S. 1,324,030, U.S. 1,464,990, U.S. 1,701,225, U.S. 2,585,387, U.S. 1,581,819, U.S. 1,634,122, British 647,395, and British 263,263).

A process has been developed whereby sodium chloride is reacted with hydrofluoric acid. In this case, in order to obtain economical yields of sodium fluoride, it is necessary to neutralize, usually with ammonia, the hydrochloric acid generated so that the reaction may proceed to substantial completion. Instead of sodium chloride, sodium nitrate and sodium sulfate have been used (U.S. 1,464,991 and U.S. 1,464,990). It is clear that the reaction is between ammonium fluoride and sodium chloride, or sodium nitrate or sodium sulfate. Similar reactions are given by A.A. Chizhik, Gosundarst, Inst. Prikladnai Khim., Sparnik Statei, 1919–39, 56–73 (1939), C. A. 36:2093. The yields of sodium fluoride in these processes are quite good. However, the mother liquor contains sodium fluoride and ammonium chloride and it is difficult to process this liquor to recover pure ammonium chloride and sodium fluoride. In most cases the mother liquor was heated with milk of lime in order to recover the ammonia.

Sodium fluoride relatively low in silica has been made from fluosilicic acid by first forming fluoboric acid and then reacting this fluoboric acid with sodium carbonate, sodium bicarbonate or sodium hydroxide to form sodium fluoride and recovering the boric acid as the sodium salt (U.S. 2,692,186).

A recent patent discloses the production of a mixture of sodium fluoride and calcium oxide by fusing a mixture of fluorspar and sodium hydroxide (U.S. 2,690,430). It is impossible to recover sodium fluoride from such a mixture since, when it is added to water, it reverts to calcium fluoride and sodium hydroxide.

Many proposals have been made for making sodium fluoride from fluosilicic acid. This interest is based on the fact that this acid is an abundant waste product of the manufacture of superphosphate, phosphoric acid and of the purification of graphite.

My invention is based broadly on the discovery that the presence of ammonium hydroxide in aqueous solution depresses the solubility of sodium fluoride in water and at the same time increases the solubility of ammonium chloride. This increases the proportional amount of sodium fluoride precipitated when sodium chloride, sodium nitrate, or sodium sulfate is reacted with ammonium fluoride, and also permits the removal of pure ammonium chloride and sodium fluoride from the mother liquors. The yields of sodium fluoride and ammonium chloride, or ammonium nitrate or ammonium sulfate are quantitative.

It is visualized that the ammonium fluoride used in my process would be produced from this waste fluosilicic acid although ammonium fluoride from any source is equally useful. For example the reaction of low grade fluorspar (containing relatively large amounts of silica) will react with sulfuric acid and other acidic materials to produce fluosilicic acid and this acid is a suitable raw material for my new process.

In producing ammonium fluoride, fluosilicic acid at a temperature of about 50–90° C. and at a concentration of 25–30% is first admixed with anhydrous ammonia. This converts the fluosilicic acid to ammonium fluoride, which stays in solution, and silica, which precipitates as a filterable solid. While the temperature of the reaction is stated to be about 50–90° C., a preferred range is 75–85° C. Above about 90° C., considerable difficulty is experienced in retaining the ammonia in the system. At the lower temperatures, i.e. below about 50° C., the silica tends to be hydrated and is difficult to filter. It is preferred to use fluosilicic acid at a concentration of about 25–30%. Obviously, lower concentrations can be used but this means a corresponding increase in the volume of solution to be handled. Acid of the desired concentration can be readily made by absorbing $SiF_4$ vapors in water. When the fluosilicic acid is a product of phosphate rock acidulation, it may contain a small amount of solid material brought over as dust or mist from the reactor. Solids can be removed either by a preliminary scrubbing of the off gases with fluosilicic acid or by filtering the recovered acid. Inert solids in the starting acid would not contaminate the present system but would be removed in the first filtration and discarded along with the silica.

The ammonia may be added as ammonium hydroxide but this would effect a large increase in the amount of water in the system, which water must subsequently be evaporated. It is much preferred to use substantially anhydrous ammonia, which may be introduced as either a gas or liquid. The system should be closed to prevent loss of the ammonia. The ammonia first neutralizes the acid to yield precipitated silica and soluble ammonium fluoride. Obviously, for efficient operation, it is necessary to add an amount of ammonia equivalent stoichiometrically to the fluosilicic acid. To insure complete reaction and to improve the filterability of the precipitated silica, sufficient excess of ammonia is added to raise the pH of the system to a value of 8–9, preferably above 8.5.

After the ammonia addition, the reaction mixture, which is a slurry of precipitated silica in ammonium fluoride solution containing a slight amount of free ammonia, is cooled to room temperature and is filtered. Cooling this solution prevents loss of the excess ammonia and lowers the concentration of the silica in the ammonium fluoride solution.

The filtrate from the preceding step contains dissolved ammonium fluoride, which is precipitated as sodium fluoride by the addition of sodium chloride. The solubility of the sodium fluoride is relatively low and in this step, approximately 85% of the total fluoride is precipitated. The sodium chloride may be added directly as a salt or as a brine. Water added at any stage of the process should be kept as low as possible since it must subsequently be evaporated. Commercial salt contains a small amount of insoluble impurities which would contaminate the sodium fluoride product if the salt is added directly. Accordingly, it is preferred to use a very concentrated brine which is filtered before it is added to the ammonium fluoride solution. By operating at high concentrations, the amount of water added with the sodium chloride is maintained reasonably low. The amount of sodium chloride should, obviously, be stoichiometrically equivalent to the ammonium fluoride since the reaction is a simple double displacement type. Excess sodium chloride serves no useful purpose and is removed along with the ammonium chloride as hereinafter described.

The sodium fluoride residue is washed with water to remove soluble salts. Obviously, a minimum amount of water is used since the sodium fluoride is soluble to a slight extent in water. The washings may be mixed with the filtrate or may be discarded depending on the cost of evaporating the water. Since the washings are substantially saturated with sodium fluoride, it is contemplated that they will be mixed with the filtrate for further processing to recover sodium fluoride. At this stage, the filtrate from the ammonium chloride recovery step, described below, is added to the filtrate from the first sodium fluoride filtration. The combined filtrates and washings are then evaporated to crystallize a large portion of the sodium fluoride and a large portion of the ammonium chloride. Then, anhydrous ammonia is added to the mixture in an amount sufficient to dissolve all of the ammonium chloride. It should be noted that ammonium chloride is relatively soluble in anhydrous ammonia or in aqueous solutions of ammonia. Addition of ammonia at this stage depresses the solubility of sodium fluoride so that an additional amount is crystallized out. The solution is then filtered to remove sodium fluoride, which, is then washed free of soluble impurities. Here, again, the washings may be discarded or returned to the filtrate from the first sodium fluoride filtration. The filtrate from this second sodium fluoride filtration is heated to evaporate all of the ammonia present but without any appreciable evaporation of water. Evaporation of the ammonia causes the ammonium chloride to crystallize and, since the ammonia had depressed the solubility of sodium fluoride, there is no danger of crystallizing sodium fluoride if the amount of water is not reduced below that to which the original filtrate was concentrated. The ammonium chloride-containing slurry is then filtered to remove pure ammonium chloride. The filtrate is returned to the system for mixing into the filtrate from the first sodium fluoride separation. Obviously, this filtrate could be discarded if the recycling is not desired. Also, it may be desirable to discard this filtrate periodically because of an undesirable build-up of impurities. However, maximum recovery dictates that this filtrate be recycled as described.

The sodium fluoride from the second separation step may be washed separately or it may be admixed with the original sodium fluoride residue and the entire batch washed.

By operating according to the foregoing method, sodium fluoride yields of the order of 98% based on fluorine input are obtained. The other 2% is lost in washings or filter cakes which are discarded.

The sodium fluoride obtained by this method may be dried and stored as desired. The material is about 99.9% sodium fluoride and contains less than 0.01% of silica and other impurities. The low impurities content of the sodium fluoride makes it eminently suitable for the use in the manufacture of aluminum where only minute amounts of silica and phosphorus can be tolerated.

The present invention will be further illustrated by the following examples:

*Example I*

6.72 parts of NaCl and 4.26 parts of $NH_4F$ were reacted in 16.56 parts of water at 25° C. The slurry was filtered at 25° C. to recover 4.15 parts NaF. The mother liquor from this step was mixed with a liquor composed of 1.93 parts of $NH_4Cl$, 0.22 part of NaF and 7.8 parts water. The combined liquid was evaporated to remove 12.55 parts $H_2O$. The solution was brought to 25° C. and ammonia gas was passed in until 4.59 parts had been absorbed. The slurry was filtered at 25° C. to remove 0.67 part NaF. The filtrate was evaporated to remove 4.59 parts of ammonia which was used in the next cycle. The filtrate was further evaporated to remove 3.9 parts of water, and filtered to remove 6.15 parts $NH_4Cl$. The mother liquor was composed of 1.93 parts NH₄Cl, 0.22 part NaF and 7.8 parts water and this was used in the next cycle as outlined above.

*Example II*

To a solution composed of 0.22 part NaF, 2.0 parts NH₄Cl and 5.04 parts water was added 5.6 parts NH₄F, 8.85 parts NaCl and 5.81 parts water. Ammonia gas was passed into this solution until 4.59 parts had been absorbed. The slurry is brought to 25° C. and is filtered to remove 6.35 parts NaF. The mother liquor was heated to remove 4.59 parts NH₃ which was used in the next cycle. The solution was evaporated to remove 5.81 parts water. The slurry was brought to 25° C. and filtered to remove 8.09 parts NH₄Cl. The filtrate was composed of 0.22 part NaF, 2.0 parts NH₄Cl and 5.04 parts water and this was used in the next cycle.

I claim:

1. The method of preparing silica-free sodium fluoride comprising the steps of adding to fluosilicic acid at a temperature of about 50–90° C. an equivalent amount of ammonia, adjusting the pH to about 8–9 by further addition of ammonia, thereby producing a slurry of silica in an aqueous solution of ammonium fluoride, filtering said slurry to remove silica, cooling the filtrate to about room temperature, adding thereto sodium chloride equivalent to the ammonium fluoride whereby a slurry of solid sodium fluoride in aqueous ammonium chloride solution is formed, filtering the slurry to remove said solid sodium fluoride, admixing with the filtrate the filtrate from the ammonium chloride filtration step described below comprising an aqueous solution of ammonium chloride and sodium fluoride, evaporating the resulting mixed solution to yield a slurry of sodium fluoride and ammonium chloride in an aqueous solution saturated with respect to both salts, adding sufficient anhydrous ammonia to dissolve the ammonium chloride, thereby depressing the solubility of sodium fluoride, filtering off the sodium fluoride, evaporating the ammonia from the filtrate, thereby causing ammonium chloride to crystallize, filtering off the ammonium chloride, returning the filtrate to the filtrate from the first step above, and washing the sodium fluoride residues free of soluble salts, thereby obtaining substantially pure sodium fluoride.

2. The method of producing silica-free sodium fluoride comprising the steps of admixing stoichiometric amounts of sodium chloride and ammonium fluoride in aqueous solution whereby a slurry of solid sodium fluoride in aqueous ammonium chloride solution is formed, separating therefrom said solid sodium fluoride, adding to the filtrate thus obtained the mother liquor from the ammonium chloride recovery step hereinafter described, evaporating a sufficient amount of the aqueous medium to crystallize additional sodium fluoride and ammonium chloride, adding to said mixture sufficient anhydrous ammonia to redissolve said ammonium chloride, separating the solid sodium fluoride therefrom, heating the resulting filtrate to drive off the ammonia and re-crystallize a substantial portion of the ammonium chloride, separating said ammonium chloride from its mother liquor, recycling the mother liquor to the system for admixture with the filtrate from the first sodium fluoride recovery step, and washing the sodium fluoride free of soluble salts.

3. The method of preparing silica-free sodium fluoride comprising the steps of admixing with fluosilicic acid sufficient ammonia to adjust the pH of the mixed solution to a value of 8–9, thereby precipitating substantially all of the silica and forming ammonium fluoride in solution, separating said silica from the ammonium fluoride mother liquor, adding to said mother liquor sodium chloride stoichiometrically equivalent to the ammonium fluoride, thereby precipitating a major portion of the fluorine as sodium fluoride, separating and washing said sodium fluoride precipitate, concentrating said mother liquor to crystallize a portion of the dissolved ammonium chloride and sodium fluoride, adding thereto sufficient anhydrous ammonia to solubilize the ammonium chloride and separating and washing the solid sodium fluoride from the resulting mother liquor.

4. The method of preparing silica-free sodium fluoride comprising the step of admixing equivalent quantities of anhydrous ammonia with 25–30% fluosilicic acid at 60–85° C. to adjust the pH to 8–9, thereby to precipitate the silica in aqueous NH₄F solution, filtering to remove said silica, adding NaCl to the filtrate in an amount at least stoichiometrically equivalent to the ammonium fluoride, thereby precipitating a major portion of the fluoride as sodium fluoride, filtering to recover said sodium fluoride, adding to the filtrate the mother liquor from the ammonium chloride recovery step outlined below, evaporating the mixed filtrate to crystallize additional sodium fluoride in admixture with solid ammonium chloride, adding anhydrous ammonia to dissolve the ammonium chloride, filtering to remove the solid sodium fluoride, heating the filtrate to drive off the ammonia and re-crystallize the ammonium chloride without substantial evaporation of water, filtering off the solid ammonium chloride, recycling this filtrate to the filtrate obtained from the first sodium fluoride removal step, and washing and drying the solid sodium fluoride residues.

References Cited in the file of this patent

UNITED STATES PATENTS

| | | |
|---|---|---|
| 582,938 | Mills | May 18, 1897 |
| 1,464,990 | Howard | Aug. 14, 1923 |
| 2,780,522 | Gloss et al. | Feb. 5, 1957 |
| 2,780,524 | Gloss et al. | Feb. 5, 1957 |

FOREIGN PATENTS

| | | |
|---|---|---|
| 103,118 | Great Britain | 1918 |

OTHER REFERENCES

Mellor: "Comprehensive Treatise on Inorganic or Theoretical Chemistry," vol. 2, pages 515, 569 (1922), Longmans, Green & Co., New York, N.Y.